US009489112B2

(12) United States Patent
Agarwal et al.

(10) Patent No.: US 9,489,112 B2
(45) Date of Patent: Nov. 8, 2016

(54) RECOMMENDED NEWS EDITION ON A MAP USING GEO ENTITIES

(71) Applicant: Google Inc., Mountain View, CA (US)

(72) Inventors: Mehul Agarwal, Boston, MA (US); Sami Mohammed Shalabi, Lexington, MA (US); Maurice Shore, Carlisle, MA (US); Jokubas Zukerman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 219 days.

(21) Appl. No.: 14/144,549

(22) Filed: Dec. 31, 2013

(65) Prior Publication Data
US 2015/0186531 A1 Jul. 2, 2015

(51) Int. Cl.
G06F 17/30 (2006.01)
G06F 3/0484 (2013.01)
G06F 17/24 (2006.01)

(52) U.S. Cl.
CPC ....... *G06F 3/04842* (2013.01); *G06F 17/3087* (2013.01); *G06F 17/241* (2013.01)

(58) Field of Classification Search
CPC ............. G06F 17/241; G06F 17/3087; G06F 3/04842
USPC ....................................................... 707/722
See application file for complete search history.

(56) References Cited

U.S. PATENT DOCUMENTS

| | | | | |
|---|---|---|---|---|
| 8,370,348 B1 * | 2/2013 | Reilly | ................... | G06Q 30/02 707/731 |
| 8,375,073 B1 * | 2/2013 | Jain | ................... | G06F 17/3053 707/729 |
| 2002/0070967 A1 | 6/2002 | Tanner et al. | | |
| 2005/0165743 A1 | 7/2005 | Bharat et al. | | |
| 2008/0033652 A1 * | 2/2008 | Hensley | ................ | G06Q 10/08 702/5 |
| 2009/0132486 A1 * | 5/2009 | Leeds | ............... | G06F 17/30241 |
| 2009/0265309 A1 | 10/2009 | Eo et al. | | |
| 2010/0185663 A1 | 7/2010 | Lei et al. | | |
| 2011/0040644 A1 * | 2/2011 | Juda | ...................... | G06F 17/241 705/26.3 |
| 2012/0225672 A1 * | 9/2012 | Tholkes | ................ | H04W 4/206 455/456.3 |
| 2013/0167034 A1 | 6/2013 | Ickman et al. | | |
| 2013/0246452 A1 * | 9/2013 | Vadrevu | ............ | G06F 17/30867 707/769 |
| 2014/0164365 A1 * | 6/2014 | Graham | ................. | G06Q 50/01 707/723 |
| 2014/0207860 A1 * | 7/2014 | Wang | .................... | H04L 65/403 709/204 |
| 2015/0026255 A1 * | 1/2015 | Wexler | ................... | H04L 67/22 709/204 |

OTHER PUBLICATIONS

Article entitled "Annotating News Video with Locations", by Yang et al., dated 2006.*

(Continued)

*Primary Examiner* — Mahesh Dwivedi
(74) *Attorney, Agent, or Firm* — Morris & Kamlay LLP

(57) ABSTRACT

Described embodiments enable the presentation to a user of news articles or other content that is of likely interest to a user and that is geographically relevant to the user's location or region of interest. A news delivery system includes an ingest module that assigns topics and locations to available content, a profile engine that determines profile topics and geographic locations that a particular user finds relevant, and a news delivery module that selects content for the user based on the operation of the ingest module and the profile engine. In one embodiment, the profile engine performs decay processing to remove stale topics and locations from a user's profile. In related aspects, the profile engine maintains multiple profiles for the user.

14 Claims, 10 Drawing Sheets

(56) References Cited

OTHER PUBLICATIONS

Article entitled "3WNews: Who, Where, and When in News Video", by Yang et al., dated Oct. 27, 2006.*
Article entitled "NewsStand" A New View on New, by Teitler et al., dated Nov. 8, 2008.*
Article entitled "Reading News with Maps: The Power of Searching with Spatial Synonyms", by Samet et al., dated 2009.*
Article entitled "About NewsStand", by NewsStand, dated Aug. 7, 2011.*
Article entitled "Multifacted Geotagging for streaming news", by Lieberman, Copyright 2012.*
PCT International Search Report and Written Opinion for PCT/IB2014/067452, Apr. 10, 2015, 11 Pages.

* cited by examiner

RECOMMENDED NEWS EDITION ON A MAP USING GEO ENTITIES

BACKGROUND

Field

Described embodiments concern the display of news articles to users of computing devices, and in particular the selection and display of news articles of particular geographic interest to the user.

Description of the Related Art

Users of computers, tablets, smartphones and other network-enabled devices can access news content over a network. For example, many newspapers and periodicals have online editions available to readers either for free, or through various subscription policies.

While many news consumers access this content directly, e.g., by accessing a URL for a web site associated with the news source itself, other consumers take advantage of news aggregators, which present news content from disparate sources to a user in a single user interface. The news consumer can then select particular content of interest and be directed to that content via the news aggregator.

SUMMARY

Described embodiments enable the presentation to a user of news articles or other content that is of likely interest to a user and that is geographically relevant to the user's location or region of interest.

A news delivery system includes an ingest module that assigns topics and locations to available content, a profile engine that determines profile topics and geographic locations that a particular user finds relevant, and a news delivery module that selects content for the user based on the operation of the ingest module and the profile engine.

In one embodiment, the profile engine performs decay processing to remove stale topics and locations from a user's profile. In related aspects, the profile engine maintains multiple profiles for the user.

The figures depict embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1:
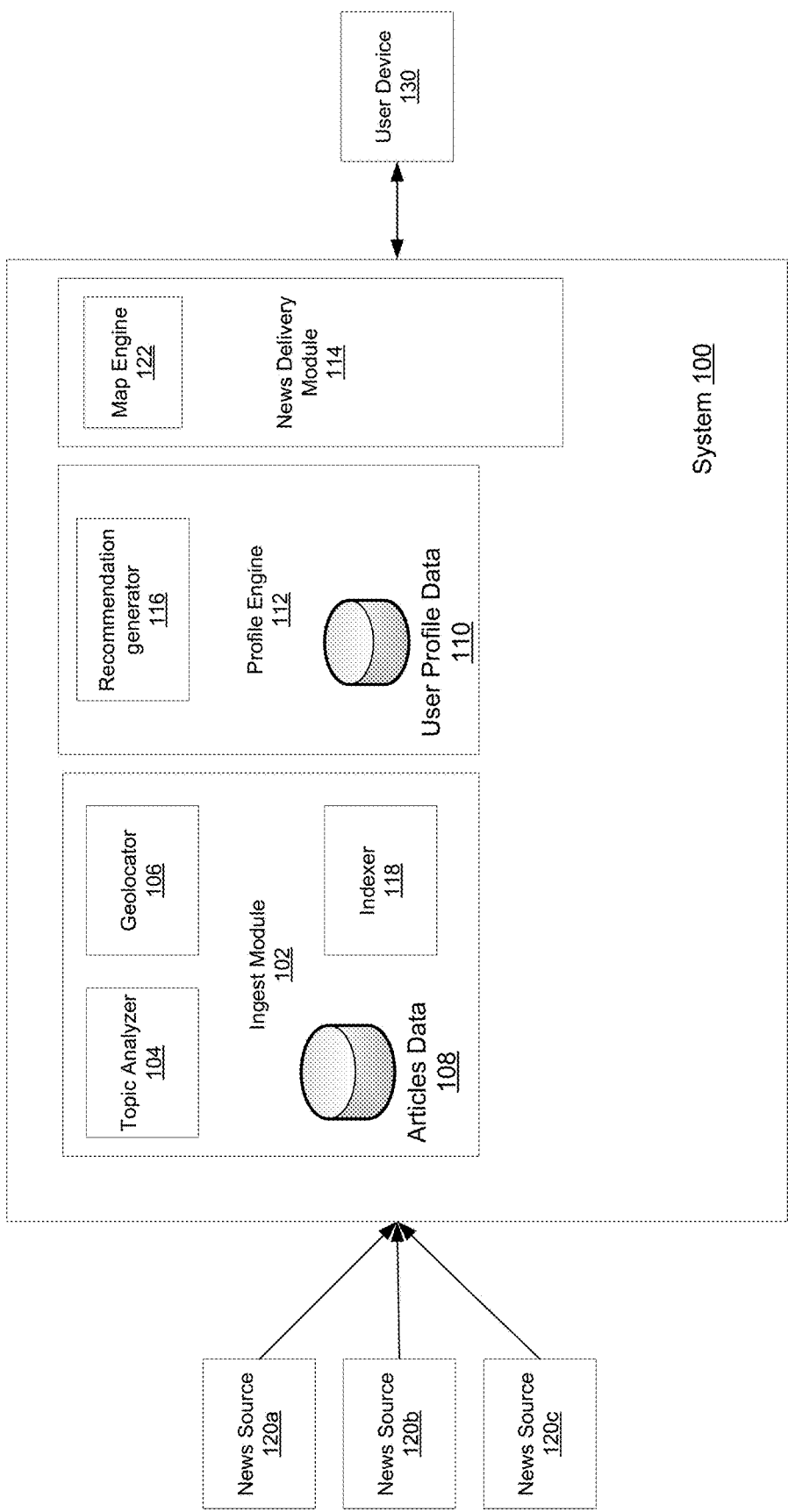
FIG. 1 is an illustration of a system for providing news content to users in accordance with one embodiment.

FIG. 1 illustrates a system 100 for providing geographically relevant news to a user in accordance with one embodiment. System 100 includes an ingest module 102, profile engine 112, and news delivery module 114. Ingest module 102 further includes a topic analyzer 104, geolocator 106, indexer 118 and articles database 108. Profile engine 112 includes a user recommendation generator 116 and user profile database 110. News delivery module 114 includes a map engine 122. Also illustrated in FIG. 1 are a plurality of news sources 120a, 120b, 120c (generally 120), and a user device 130. Each of these is described in further detail below. Note that while few or one instance of each of these elements is illustrated in FIG. 1, when implemented system 100 may include several logical or physical corresponding modules performing the features described here. And while only one user device 130 and three news sources 120 are illustrated for ease of illustration, hundreds, thousands, or more such devices may be used with system 100.

System 100 communicates with news sources 120 and user device 130 over a network (not shown). The network is typically the Internet, but can be any network, including but not limited to any combination of a LAN, a MAN, a WAN, a mobile, a wired or wireless network, a private network, or a virtual private network. System 100 is connected to the network through a network interface.

News source 120 includes text, audio, or video content, or a combination thereof accessible directly or indirectly to system 100 and to user device 130 over a network such as the Internet. Each news source 120 provides one or more news content items in an ad hoc or periodic manner. For example, a news source may be a web site associate with a magazine, newspaper, radio station or television station. News source 120 makes its content available to viewers such as system 100 and user device 130 either for free or at some cost. In this description, we refer interchangeably to this type of content as news content, news articles, and articles. Those of skill in the art will understand from this disclosure however that the described embodiments have application not only to news content per se, but generally to any corpus of documents that have associated topics and locations.

Ingest module 102 discovers, analyzes and indexes news content provided by news sources 120. Indexer 118 in one embodiment crawls and discovers news sources 120 and any articles available via those sources. Topic analyzer 104 and geolocator 106 attribute weighted topics and locations to indexed news content and store indicia of the attributes and content in articles database 108 as detailed below.

Profile engine 112 processes information particular to the user, as detailed below with respect to FIG. 3, to obtain and store user characteristics relevant to what content may be appropriate for that user. Recommendation generator 116 provides processing to determine what material made available by news source 120 is most appropriate to be presented to user device 130, as detailed below. User recommendation generator 116 generates specific content for user device 130 based on the results of queries to indexer 118 and profile information available for the user.

News delivery module 114 provides user device 130 with a curated list of news articles to be viewed. In one embodiment, news delivery module 114 presents a user interface, e.g., a web site or mobile application that includes a list of news content items. The items may be sorted according to their associated topics or location as further described below. A user of user device 130 can select items of interest and then be directed to the selected items. For example, a user may select a thumbnail image or a snippet of an article and be directed to a web site hosting the content, i.e. news source 120.

User device 130 can be a laptop or desktop computer, smartphone, tablet, or any other device capable of accessing system 100 and news source 120 over a cellular or wide area network. The user operating user device 130 can be an individual, group of individuals, corporate entity, or automated computer system. For ease of description, we refer generally to a "user", and those of skill will recognize that this includes either the user herself, the user's device, or the combination of the two, as may be appropriate in context.

Process Overview

Figure 2:
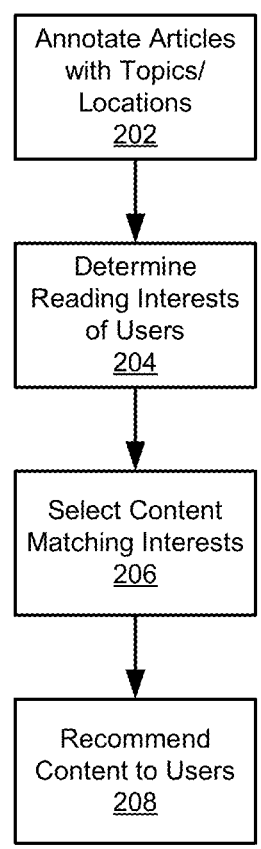
FIG. 2 is a flowchart illustrating high-level steps for providing topically and geographically relevant news content to a user.

FIG. 2 is a flowchart illustrating high-level steps for providing topically and geographically relevant news content to a user. System 100 obtains news content from news sources 120 and annotates it 202 according to the topics and locations relevant to the content. Profile engine 112 determines 204 the topics and locations that are part of a user's reading interests and maintains that information in a user profile. Recommendation generator 116 selects 206 content that matches a user's interests and recommends 208 that content to the user. We describe below each of these steps in greater detail.

Indexing and Topic/Location Attribution

As indexer 118 discovers a news content item, topic analyzer 104 identifies one or more topics to associate with the content item. In one embodiment, topics are identified using the Google Knowledge Graph database of topics (not shown). This database includes a very large collection of known topics, as well as connections between topics based on their relevance to one another. In other embodiments, other collections of topics can be used as most appropriate for the operating environment.

In one embodiment, ingest module 102 is configured to accept any new item of content (e.g., a news article) provided by news source 120, and annotate the item with topics. For example, if the word "United" appears multiple times in connection with terms relating air travel in the new item, the topic of "United Airlines" or "UAL" is annotated to the item. If, instead, the word "United" appears multiple times in connection with terms relating to trucking or moving companies, the topic of "United Van Lines" is annotated to the item. In some embodiments, weighting is associated with each such annotation. For instance, for one item it might be very clear that United Airlines was intended rather than United Van Lines, while in other instances it may be somewhat ambiguous which company topic corresponds to the item. In some embodiments, ingest module 102 processes millions of new items every day, and is also implemented using portions of the aforementioned Google Knowledge Graph facility.

In such embodiments, topic analyzer 104 uses two steps to find the most relevant topics for an item. The first step involves finding every topic that is actually mentioned in the item. For example, the word "United" is exactly the same as at least two known topics, based on the discussion above, so those topics are considered candidates and, based on other terms in the item (e.g., "passengers" and O'Hare) the Knowledge Graph facility selects one and gives it a weight, for instance based on how often that topic appears in the item. The second step looks for relevant topics that are not expressly mentioned in the item and also rescores topics based on relation to other topics. For instance, if a news article discusses issues confronting major airlines but fails to mention one of those airlines, the topic corresponding to that missing airline may nonetheless be added. Similar processing is used for the rescoring—if the only topics identified with regard to the news article are very closely related topics, the weight of each of those topics may be increased. In other embodiments, different weighting schemes are used as appropriate for the specific application.

Topic analyzer 104 then annotates the news item with the weighted topics, and indicia of the news content and its associated weighted topics are stored in articles data 108.

Geolocator 106 also processes the news item to identify any geographic references contained within the content item itself, or within any associated metadata. For example, a content item may be a news article such as, from the example above, United Airlines, and the article may be discussing United's large presence in Chicago. Or an article might be describing a recent weather event in Boston, Mass.; or may be a news feature about the best cities in which to live in the United States, mentioning several by name; or an item that includes a dateline identifying where a news story was filed. Geolocator 106 identifies geographic locations such as those described above in a manner analogous to the way in which topic analyzer 104 discovers topics associated with the news content items. Geolocator 106 annotates the content item with a geographic location, and stores the geotagging information together with the content and topic indicia in articles data 108. Based on the annotated content, indexer 118 is therefore able to return topics associated with a particular news content item; geographic points associated with a particular news content item; news articles associated with particular topics; and news articles associated with particular geographic locations.

Determining Reading Interests of Users

Figure 3:
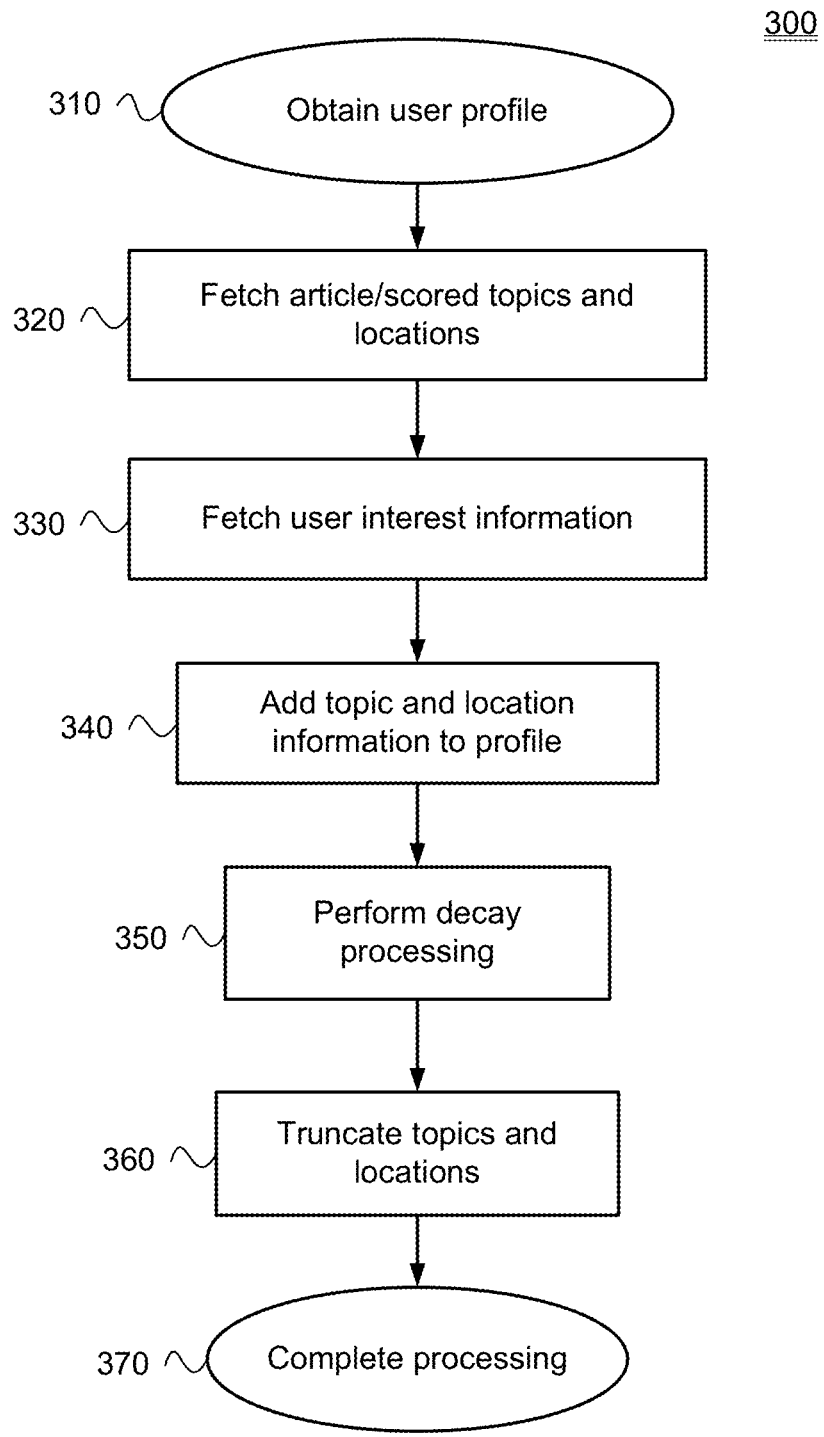
FIG. 3 illustrates a method for determining reading interests of a user in accordance with one embodiment.

Referring now to FIG. 3, there is shown one embodiment of a method 300 to determine news content interests of a particular user. It should be noted that similar techniques can be applied to determine news content interests of certain groups of users, as well, which can then be applied to individuals in that group or to individuals having characteristics similar to those in the group. In the example illustrated in FIG. 3, processing begins at step 310 by obtaining a profile corresponding to a user from user profile database 110. This profile includes information relating to the user, such as self-identified interests and, if the user has so authorized, automatically stored information relevant to the user's interests, such as historical information on articles the user has read and geographic regions of interest to the user. In one embodiment, when a user opens a mobile application or web service (such as Google Play Newsstand), method 300 obtains 310 relevant profile information (e.g., user ID, ID of the article being opened, and current time for initial processing and scored list of user interests for later processing). For offline access, information about which article is being opened and the time of access is stored and sent to user profile engine 112 the next time the user comes online.

At step 320, user profile engine 112 fetches the article information from articles database 108 and obtains the scored topics and locations that were generated for that article as detailed above. Then, at step 330, the user's interest information is fetched. This may be done from the profile information previously obtained at step 310, or a new request for just this aspect of profile information may be made, depending on the environment of use and which technique is most efficient. The interest information from the profile may be empty (e.g., for a new user) or may include both user statistics (last update time/counter information) and a collection of scored topics and locations. Each scored topic includes a topic ID, a score for the topic for this particular user, and time/counter information for this topic for this user. Similarly, each scored location includes location indicia, a score for the particular location for this user, and time/counter information for this location for this user.

Next, the topics and locations from the article are added to the user's profile (with the score for each topic and each location) at step 340 as follows. If the user's profile already contains a topic, the score for that topic is increased using a pre-defined mathematical function. In one embodiment, a user's score for a particular topic is incremented by an appropriate amount whenever a user reads an article corresponding to the topic. A score for a location in the user's profile is incremented analogously. Continuing the O'Hare example mentioned previously, the user's O'Hare score may currently be 10 and Chicago score may be 3; if the user reads an article having an O'Hare topic score of 0.5 and a Chicago location score of 1, the user's new score for O'Hare is incremented to be 10.5, and the user's new score for Chicago is incremented to be 4. If the profile does not already contain the topic or location, a new scored topic or scored location is added to the profile in a similar manner. In this step, a last update time for each topic and location is set to the current time, and counters for the topic and location are incremented; a last update time for the profile is also updated, and a counter for the profile is also incremented. In some embodiments, one or more of the counters is not incremented if the last update was very recent, so that all updates happening within a certain time period (e.g., a day) are treated as one.

Periodically, scores of topics and locations in the profile are decayed 350 using a pre-defined decay function; in one embodiment exponential decay is used to appropriately allow the user's old interests to phase out and newer interests to be ranked higher. By comparing the last update counter of a topic or location with the last update counter of the profile, it is known how many times the user has read content that was not related to the current topic or location. Thus, "stale" topics and locations are demoted over time. While step 350 is shown in this embodiment as being performed in connection with a profile update, in other embodiments decay processing is performed independent of any particular update, for instance at a time when processing resources are more available (e.g., periodically during a time of day with low processing usage). In step 360, low-scoring topics and locations are truncated, i.e., removed from the user's profile. This is helpful in reducing processing overhead. Note however that the rate of decay for a topic and the rate of decay for a location may differ significantly to reflect implementations in which either topics or locations are considered of greater importance, or to reflect observations about user behavior borne out during implementation. Processing for this method is then complete 370.

In some embodiments, multiple profiles are generated for a user to improve performance of system 100. For instance, monthly profiles are created in one embodiment to give of view of topics and locations that are most interesting to the user at a particular time of year. While water skiing and colder destinations may drop off the user's profile in autumn, they may become important again next May, and use of such multiple profiles for a particular user allows recurring interests to be captured. Likewise, separate profiles for various categories may be maintained for each user, to better keep track of topics of interest to the user. For example, a separate profile for a user regarding presidential elections that would otherwise be subject to decay processing 350 will be maintained over a several year period. The scored topics thus generated for each profile are then used to generate recommendations or score search results as described elsewhere herein.

User profile data storage 110 includes information about an individual user to facilitate the operation of system 100. Stored information includes identifying information about the user. In some embodiments this is information provided by the user manually, while in other embodiments the user may request that such information is obtained automatically, e.g., from other facilities the user has joined or other subscriptions the user has. Profile data 110 maintains a scored or otherwise weighted list of topics that are of most interest to the user, generated as detailed below.

Recommending Content to Users

Figure 4:
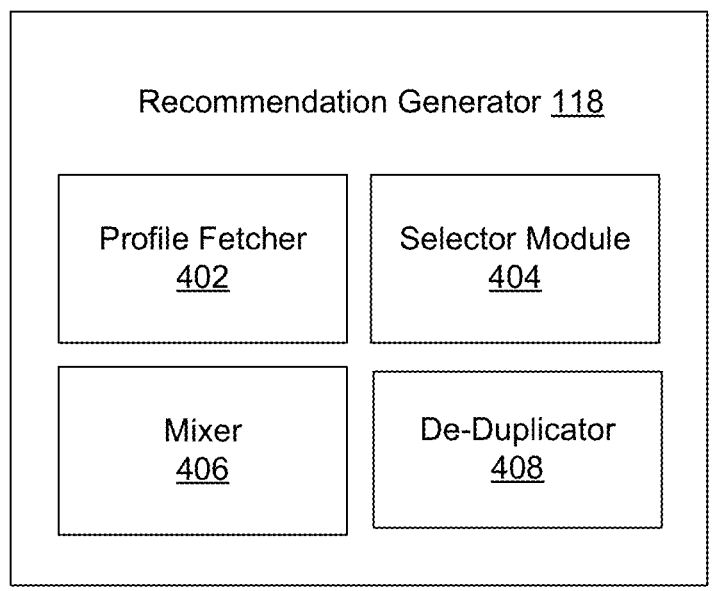
FIG. 4 illustrates a profile engine in accordance with one embodiment.

FIG. 4 illustrates a functional view of recommendation generator 118 used as part of profile engine 112. Recommendation generator 118 is used by profile engine 112 to take information about a particular user and, from that information, determine what content to present to the user via news deliver module 114.

Recommendation generator 118 includes various subsystems to facilitate its operation. In the embodiment illustrated in FIG. 4, recommendation generator 118 includes a profile fetcher 402, a selector module 404, a mixer 406, and a de-duplicator 408. Many of these subsystems interact with one another, as described below.

Profile fetcher 402 provides a mechanism for identifying topics and locations that appear to be of interest to the individual user. In one embodiment, these topics and locations have been stored in user profile database 110. In some instances, such topics can be manually identified by the user while in other instances they are generated automatically based on an observation of user behavior. In some embodiments, a user's current location is used as input to recommendation generator 118. The user's location may be reported explicitly by the user or the user's device, or derived from the user's IP address or other geolocating methods known in the art. Operation of profile fetcher 402 results in provision of a list of topics and locations with scores that show which are those most interesting to the user.

Once the topics and locations have been obtained, recommendation generator 118 obtains corresponding content (e.g., indicia of articles or other items) stored in articles database 108. In one embodiment, for example, this is achieved via a request to indexer 118 of ingest module 102. In various embodiments, to reduce the number of returned articles that are not of interest to the user, ingest module 102 returns only that content that is indexed by geolocator 106 as located within a maximum distance of any location specified in the request. For example, the request to indexer 118 may include "travel," "airlines," and "United Airlines" as topics, and "Boston," "San Francisco," and "Auckland" as locations. Indexer 118 would then return content items matching those topics and located within a maximum distance of any of the listed locations. In various embodiments, a maximum distance can be specified in the request or may be configured either by the user or by the implementer.

Depending on the topics and locations specified, the body of content obtained from indexer 118 may be significantly more voluminous than is desirable to present to the user. In various embodiments, selector module 404 scores the content according to a function appropriate for the nature of the use. In one embodiment, a pre-defined scoring function is used that includes factors such as: location, topic relevance, content quality, edition quality, popularity, and recency. For location, items that have been geographically tagged by geolocator 106 with locations that are geographically closer to a location of user device 130 (which as noted above may be provided automatically to system 100 by the device 130, determined based on IP address or other geolocating technology by system 100, or which may be explicitly provided by the user), receive a higher score. For relevance, items with more topics that overlap the user's profile get higher scores. For content quality, images that have higher resolutions (or resolutions more appropriate for the user's bandwidth) are scored higher; audio with characteristics more appropriate for the user (e.g., higher sampling rate for one user, lower file size for another user) are scored higher; text with word counts or reading levels most appropriate for the reader (e.g., based on self-identified or automatically determined historical preferences). For edition quality, content from editions previously determined to be "good" are scored above others. For popularity, content read by more users (in some embodiments, specifically more users with characteristics similar to those of the current user) is scored higher than other content. For recency, content that was published more recently gets a higher score. Once all of the items are scored, they are sorted according to their score.

In some embodiments, other algorithms are also used to pull content in from other sources. For example, a separate algorithm is used in some embodiments to get additional items from sources the user frequently reads/watches/listens to, or to get articles about topics or locations that the user has most recently shown interest in. Those skilled in the art will recognize that for large amounts of content, server class computers are used to make multiple requests for content in parallel, and other known techniques are used so that the processing described herein is completed quickly and efficiently.

Mixer 406 then combines results from operation of the selector module 404 to create a personalized edition of various items to be presented to the user via news deliver module 114. In one embodiment, mixer 406 is expressly constrained to include a fixed number of sets of items, each of which is drawn from the items obtained by selector module 404. For example, one personalized edition may be configured to include two articles from the user's location, two articles from sources that the user reads frequently, and two articles from topics that the user reads most frequently. In other embodiments, mixer 406 only articles within the user's location(s) of interest are included.

In some instances, operation of the mixer as described above may generate articles for one set that are highly similar to articles of another set. Therefore, a de-duplicator module 408 analyzes the selected items to determine whether they are highly similar. In one embodiment, de-duplicator module 408 compares topics in each article identified as a candidate for a set with all other articles already selected by generating a similarity score. Those skilled in the art will recognize that machine learning algorithms such as cosine similarity can readily be applied to generate such a similarity score. Depending on the diversity of information that is desired, a threshold of similarity score is applied to reject a proposed new article based on such similarity.

In another embodiment, de-duplicator module 408 is not applied until all sets have been populated. In this instance, if too much similarity is detected, than one of the items contributing to the over-threshold similarity score is rejected, mixer 406 chooses an alternate item, and de-duplication module 408 is iteratively operated until such time as no similarity threshold is exceeded.

As noted, some environments will involve millions of items of content, and system 100 will be operated for millions of users, so scalability of processing may become important in such environments. Where this is an issue, known scaling techniques such as pre-computation and storage of results are applied to speed up processing and minimize processor and memory requirements.

Delivering Geographically and Topically Relevant News to Users

In one embodiment, news delivery module 114 includes a map engine 122, which enables a user to use a map interface to identify and consume news content based on location attributes of the content. We describe the functionality of this feature below with respect to FIG. 5 in combination with Figs. F through J.

In one embodiment, a user accessing news map engine 122 is able to indicate a desire to view news items via a map-based selection. This may be selectable, e.g., through a user interface element such as a button or a link on a news reading page, presented as an option within the news reading application, or the like. In one embodiment, in response to a user activation of this feature, and referring to FIG. 6, a map 600 is presented to the user device 130. A user interface (not shown) can be used by the user to specify 502 (FIG. 5) an area of interest for display. In one embodiment the map is centered at the user device's current location, if known. Alternatively, the map can be centered at or include a location known to be of interest to the user based on the user's profile as described above. Map engine 122 then displays 504 the relevant map in the user interface. In the example of FIG. 6, map 600 includes the city of Boston.

Map engine 122 then identifies relevant stories to be displayed to the user. In one embodiment, map engine 122 passes the location of interest to recommendation engine 116, which fetches 506 articles located in the displayed region, sending a search request to indexer 118 for articles that were previously identified by geolocator 106 as relevant for the location displayed by map engine 122 as described above. In one embodiment, map engine 122 supplies latitude and longitude coordinates to recommendation engine 116, though any other suitable method for specifying location may be used.

Recommendation engine 116 receives and scores 508 articles relevant for the topics and location of interest as described above, and provides indicia of matching articles and their locations to map engine 122. The scored articles represent the best articles to recommend for that particular user within that geographic region.

Figure 7:
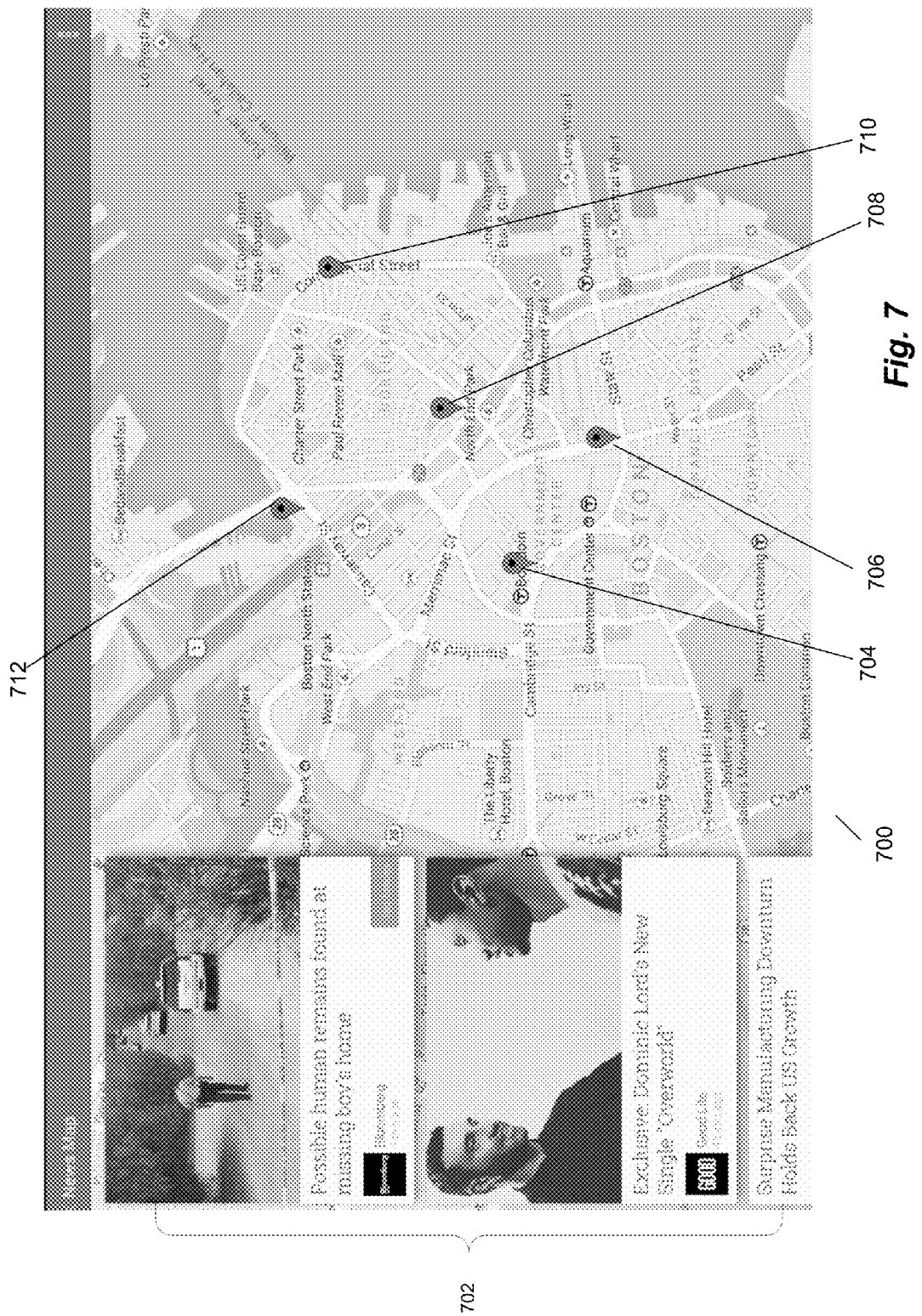
FIG. 7. illustrates a user interface for displaying news content in association with a map in accordance with one embodiment.

Map engine 122 then displays 510 information about at least some of the highest-scoring articles to the user. FIG. 7 illustrates an example of a user interface in which indicia of articles are displayed in association with map 700. In the example of FIG. 7, indicia of articles (in the illustrated case, a photograph, headline, and news source) 702 are displayed along one side of the user interface. A series of markers 704, 706, 708, 710, 712 are placed on map 700 to indicate a specific location associated with each of the displayed articles 702. In one embodiment, map engine 122 uses the geolocation information associated with each article and renders a marker at the exact or approximate location on map 700. In various embodiments and depending on the specificity of the geolocation information, map scale, and the like, the exact placement of a marker on map 700 may indicate an exact or only an approximate location for each article. At some map resolutions, for example when a map is scaled out so as to show an entire state, province or country, a different marker may be rendered to indicate that a cluster of news articles share the marked location.

Figure 8:
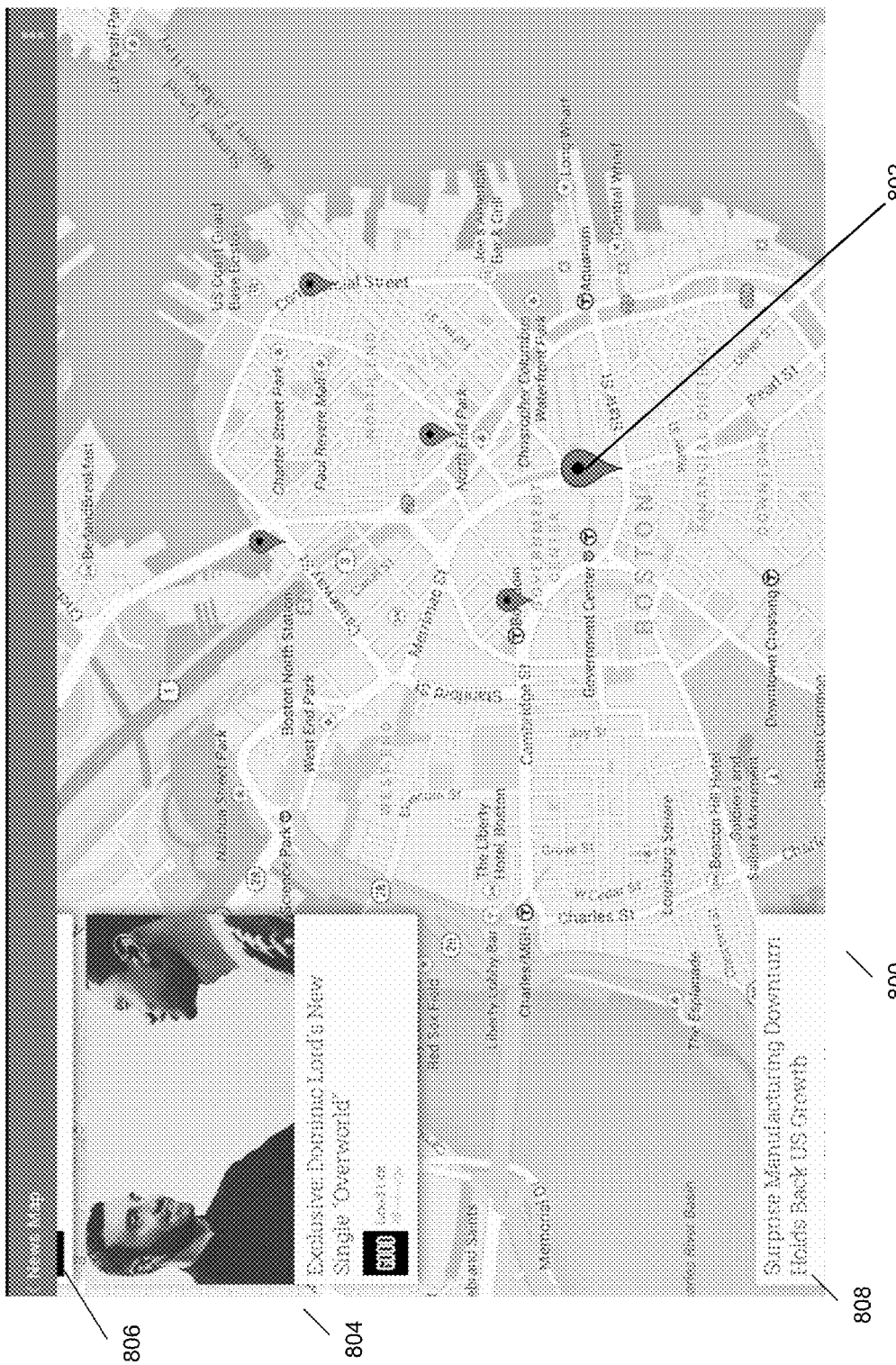
FIG. 8 illustrates a user interface for displaying news content in association with a map in accordance with one embodiment.

Referring to FIG. 8, in one embodiment when a user provides input that identifies a particular marker 802 on the map 800, map engine 122 updates the display to indicate the particular article 804 associated with the marked location. For example, depending on the hardware characteristics of user device 130, a user may mouseover a marker 802, tap the marker 802, or otherwise provide input that identifies the marker. In response, in one embodiment map engine 122 removes the news items 702 that are not associated with the indicated location, leaving only the relevant article(s) 804. Map engine 122 may scroll the display to remove the non-indicated articles, or simply delete them from the displayed user interface. In the example of FIG. 8, the non-indicated articles have been scrolled vertically off the top and bottom of the screen, leaving portions 806, 808 of some of the non-selected articles showing as a visual cue to the user that other articles exist.

In an alternative embodiment, rather than selecting a marker 802 and having the relevant article 804 indicated, a user can select one of the displayed articles 702, and map engine 122 updates the displayed map 800 to emphasize the marker 802 associated with the location of the selected story. Markers can be emphasized in a number of ways such as highlighting the markers, enlarging their size relative to other markers (as illustrated in FIG. 8), or by flashing the marker, changing its color, or providing another visual cue, or any combination of the above.

Figure 9:
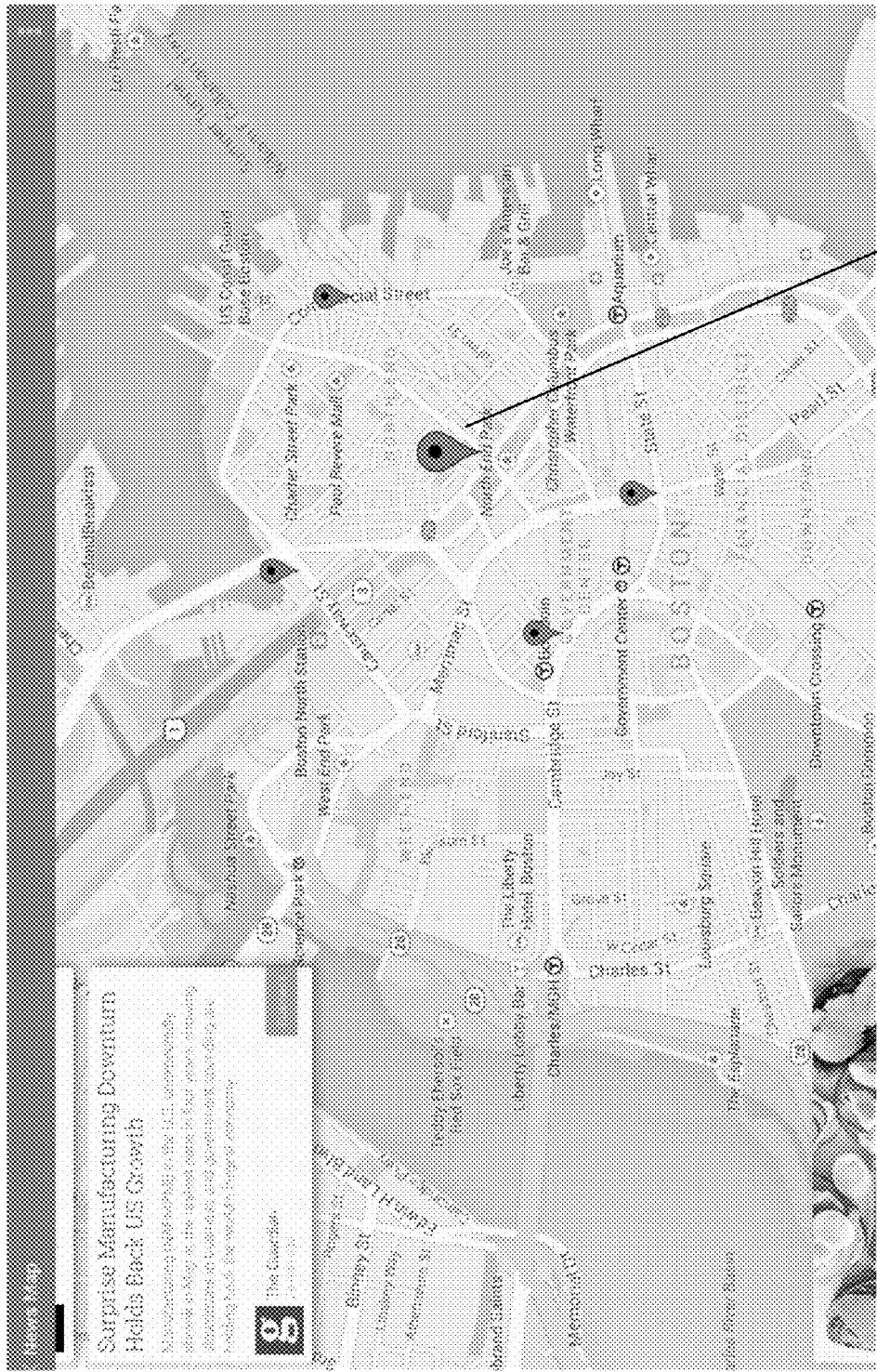
FIG. 9 illustrates a user interface for displaying news content in association with a map in accordance with one embodiment.

As illustrated in FIG. 9, should the user select another marker 902 or another story 904, map engine 122 updates the displayed map 900 to display the selected story 904 and highlight the marker 902 having an associated location.

In response to a user selecting one of the indicated articles 904, device 130 displays the actual article. For example, in one embodiment, by double tapping or double clicking on the text in the article indicia 904, user device 130 is instructed to launch a web browser window and to display the article at a location specified by news delivery module 114. The location may be specified, for example, by a link provided with the article indicia to user device 130, or user device 130 may pass a request to system 100 for the location in response to the user selecting the article indicia. In any event, the user is then directed to the article and is able to read, listen to, or watch the requested information.

Figure 5:
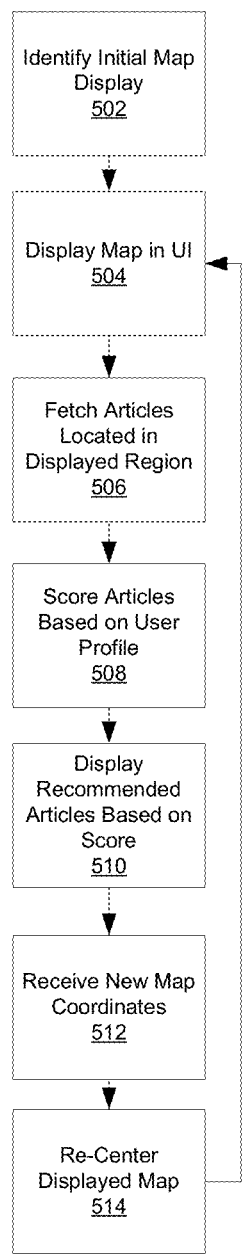
FIG. 5 is a flowchart illustrating a method for displaying geographically and topically relevant news content to a user in accordance with one embodiment.
Figure 6:
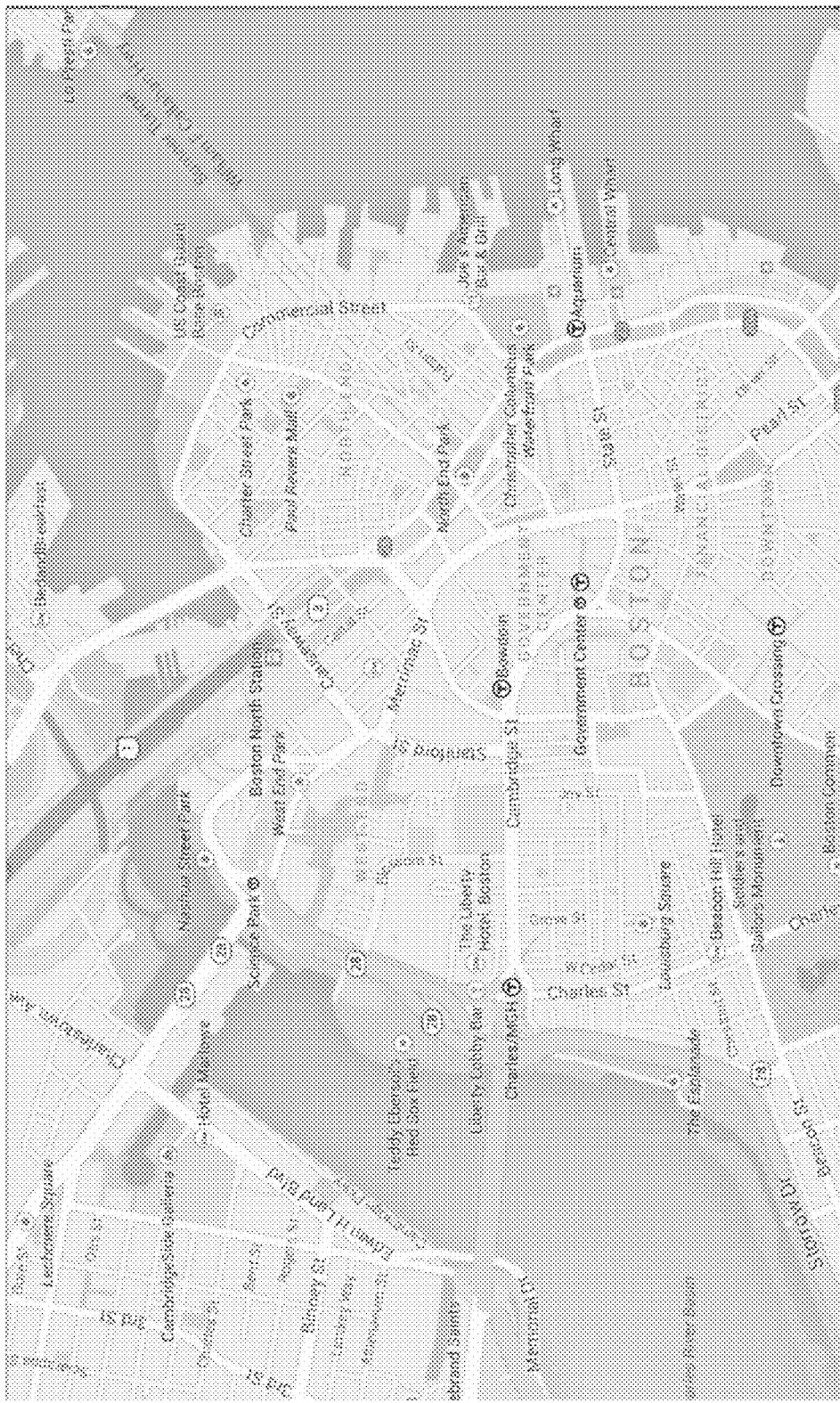
FIG. 6 illustrates a user interface for displaying a geographic region of interest in accordance with one embodiment.

Referring still to FIG. 5, should the user provide new coordinates either implicitly or explicitly, such as by scrolling the map or entering a new location into a search field, map engine 122 takes 512 the new coordinates, re-centers 514 the displayed map at the new coordinates, and displays 504 the updated map. Map engine 122 then obtains articles relevant to the new location, scores them according to the user's interests, and displays indicia of the top scoring articles on the new map in a process as described above.

In situations in which the systems or components discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

System 100 is implemented by a network of server class computers that can in some embodiments include one or more high-performance CPUs and one gigabyte or more of main memory, as well as storage ranging from hundreds of gigabytes to petabytes. An operating system such as LINUX is typically used. The operations of system 100 and its constituent components as described herein can be controlled through either hardware (e.g., dedicated computing devices or daughter-boards in general purpose computers), or through computer programs installed in computer storage on the servers of the system 100 and executed by the processors of such servers to perform the functions described herein. More detail regarding implementation of such machines is provided in connection with FIG. 10. One of skill in the art of system engineering and, for example, media content hosting or content delivery will readily determine from the functional and algorithmic descriptions herein the construction and operation of such computer programs and hardware systems.

Articles database 108 and profile database 110 can be implemented as any device or combination of devices capable of storing data in computer readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the descriptions set forth above.

Figure 10:
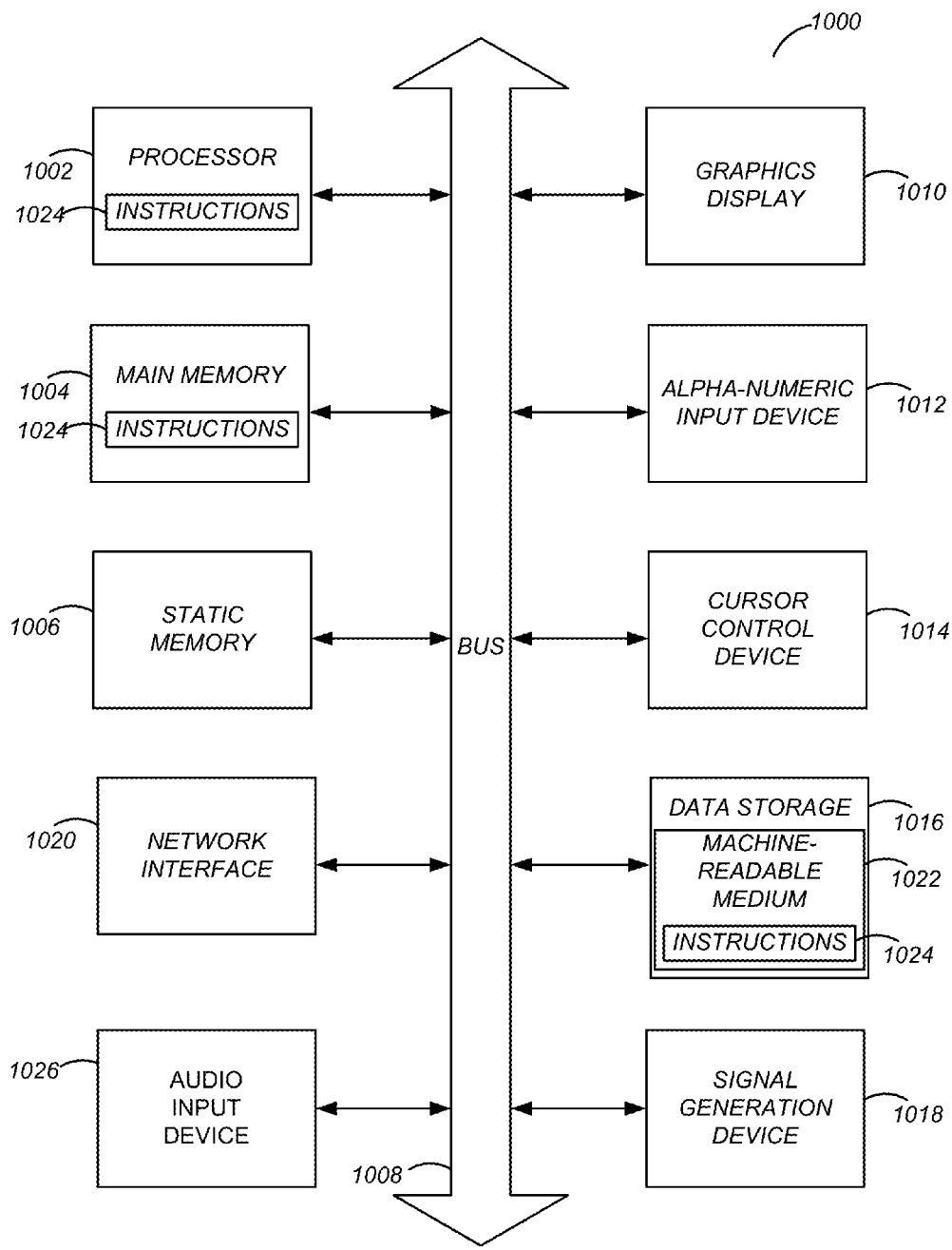
FIG. 10 illustrates an example computer architecture in accordance with one embodiment.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors included as part of the system 100. Alternatively, hardware or software modules may be stored elsewhere within system 100. System 100 includes hardware elements necessary for the operations described here, including one or more processors, high speed memory, hard disk storage and backup, network interfaces and protocols, input devices for data entry, and output devices for display, printing, or other presentations of data. FIG. 10 provides further details regarding such components.

FIG. 10 is a block diagram illustrating components of an example machine able to read instructions from a machine-readable medium and execute those instructions in a processor. Specifically, FIG. 10 shows a diagrammatic representation of a machine in the example form of a computer system 1000 within which instructions 1024 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes a processor 1002 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1004, and a static memory 1006, which are configured to communicate with each other via a bus 1008. The computer system 1000 may further include graphics display unit 1010 (e.g., a plasma display panel (PDP), a liquid crystal display (LCD), a projector, or a cathode ray tube (CRT)). The computer system 1000 may also include alphanumeric input device 1012 (e.g., a keyboard), a cursor control device 1014 (e.g., a mouse, a trackball, a joystick, a motion sensor, or other pointing instrument), a data store 1016, a signal generation device 1018 (e.g., a speaker), an audio input device 1026 (e.g., a microphone) and a network interface device 1020, which also are configured to communicate via the bus 1008.

The data store 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software) may be transmitted or received over a network (not shown) via network interface 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but not be limited to, data repositories in the form of solid-state memories, optical media, and magnetic media.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Furthermore, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for provision of a personalized electronic magazine through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:
1. A method comprising:
  annotating, by a first computer, each of a plurality of news content items with at least one topic and at least one location associated with contents of the item;

identifying, by the first computer, profile information for a user of a second computer, the profile information including a plurality of topics of interest to the user and at least one location of interest to the user;

identifying, by the first computer from the annotated news content items and profile information, a plurality of news content items to recommend to the user;

providing, by the first computer to the second computer for display in a first region of a user interface on the second computer, indicia of the plurality of recommended content items;

providing, by the first computer to the second computer for display in a second region of the user interface, a map, the map including, for each of the plurality of recommended content items, a marker representing a location associated with the respective recommended content item;

receiving, by the first computer from the second computer, input from the user identifying one of the displayed markers; and responsive to receiving the input, providing, by the first computer to the second computer, an instruction to remove from the display the recommended content items not associated with the identified marker.

2. The method of claim 1 wherein annotating the news content items further comprises:
receiving, by an indexer, the news content item;
determining, by a topic analyzer, at least one topic associated with the news content item;
determining, by a geolocator module, at least one location associated with the news content item; and
annotating the news content item with the determined topics and determined locations.

3. The method of claim 1 wherein identifying profile information for a user further comprises:
determining a location of the user; and
identifying the determined location as a location of interest to the user.

4. The method of claim 1 wherein identifying profile information for a user further comprises:
receiving a location specified by the user; and
identifying the received location as a location of interest to the user.

5. The method of claim 1 further comprising:
receiving user input identifying one of the displayed recommended content items; and
responsive to the received user input, emphasizing the display of the marker representing the location of the identified content item.

6. The method of claim 1 further comprising:
receiving a selection by the user of the indicia of one of the recommended content items; and
instructing a user device to display the indicated recommended content item.

7. A computer program product for displaying news content to a user, the computer program product stored on a non-transitory computer readable medium and including instructions configured to cause a processor to execute operations comprising:
annotating, by a first computer, each of a plurality of news content items with at least one topic and at least one location associated with contents of the item;
identifying, by the first computer, profile information for a user of a second computer, the profile information including a plurality of topics of interest to the user and at least one location of interest to the user;

identifying, by the first computer from the annotated news content items and profile information, a plurality of news content items to recommend to the user;

providing, by the first computer to the second computer for display in a first region of a user interface on the second computer, indicia of the plurality of recommended content items;

providing, by the first computer to the second computer for display in a second region of the user interface, a map, the map including, for each of the plurality of recommended content items, a marker representing a location associated with the respective recommended content item;

receiving, by the first computer from the second computer, input from the user identifying one of the displayed markers; and responsive to receiving the input, providing, by the first computer to the second computer, an instruction to remove from the display the recommended content items not associated with the identified markers.

8. The computer program product of claim 7 wherein annotating the news content items further comprises:
receiving, by an indexer, the news content item;
determining, by a topic analyzer, at least one topic associated with the news content item;
determining, by a geolocator module, at least one location associated with the news content item; and
annotating the news content item with the determined topics and determined locations.

9. The computer program product of claim 7 wherein identifying profile information for a user further comprises:
determining a location of the user; and
identifying the determined location as a location of interest to the user.

10. The computer program product of claim 7 wherein identifying profile information for a user further comprises:
receiving a location specified by the user; and
identifying the received location as a location of interest to the user.

11. The computer program product of claim 7 further comprising:
receiving user input identifying one of the displayed recommended content items; and
responsive to the received user input, emphasizing the display of the marker representing the location of the identified content item.

12. The computer program product of claim 7 further comprising:
receiving a selection by the user of the indicia of one of the recommended content items; and
instructing a user device to display the indicated recommended content item.

13. A system comprising:
a processor;
an ingest module, executed by the processor and configured, for each of a plurality of news content items, to annotate the news content item with at least one topic and at least one location associated with contents of the item;
a profile engine, executed by the processor and coupled to the ingest module, and configured, for each of a plurality of users, to =identify profile information for the user, the profile information including a plurality of topics of interest to the user and at least one location of interest to the user;
a recommendation generator, executed by the processor and coupled to the profile engine, configured to identify, from the annotated news content items and profile information, a first plurality of news content items to recommend to the user;

a news delivery module, executed by the processor and coupled to the recommendation engine, configured to provide to a computer associated with the user for display in a first region of a user interface on the computer, indicia of the first plurality of recommended news content items; and a map engine, executed by the processor and coupled to the news delivery module, configured to:
 provide to the computer for display in a second region of the user interface, a map, the map including, for each of the first plurality of recommended news content items, a marker representing a location associated with the respective recommended news content item;
 receive from the computer, input from the user identifying one of the displayed markers; and
 responsive to receiving the input, provide to the computer, an instruction to remove from the display the recommended news content items not associated with the identified marker.

14. The system of claim 13 wherein the map engine is further configured to:
 receive from the user a specification of a new geographic location;
 responsive to receiving the specification from the user, obtain from the recommendation generator a second plurality of news content items to recommend to the user, the second plurality including news content items associated with the new geographic location; and
 provide to the computer, an updated map including the new geographic location and a marker associated with at least one of the second plurality of recommended news content items.

* * * * *